No. 864,073. PATENTED AUG. 20, 1907.
J. B. BUBB.
WAGON BRAKE.
APPLICATION FILED SEPT. 17, 1906.
2 SHEETS—SHEET 1.
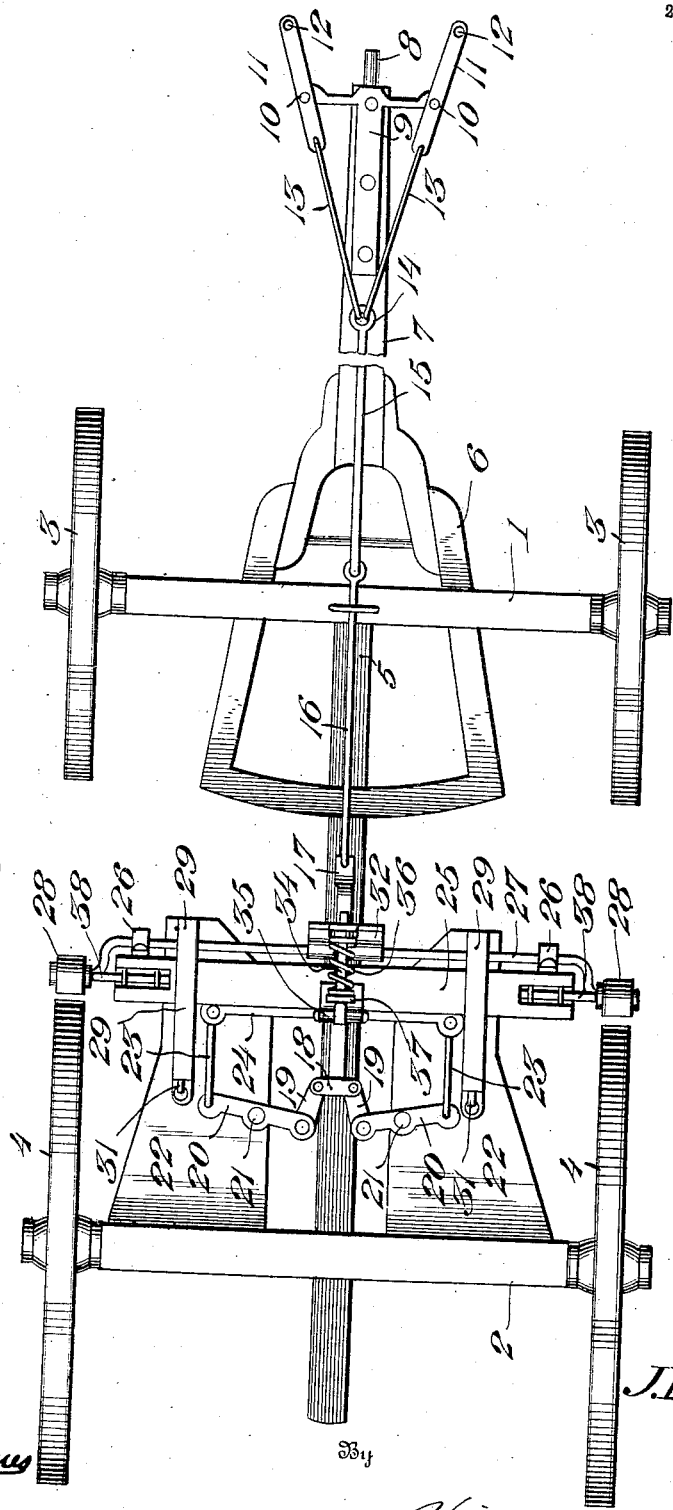
Fig. 1.
Witnesses
Phil E Barnes
Inventor
J. B. Bubb.
By
Attorney No. 864,073. PATENTED AUG. 20, 1907.
J. B. BUBB.
WAGON BRAKE.
APPLICATION FILED SEPT. 17, 1906.

2 SHEETS—SHEET 2.

Witnesses
Phil. E. Barnes

Inventor
J. B. Bubb.
By
Victor J. Evans
Attorney

UNITED STATES PATENT OFFICE.

JOHN B. BUBB, OF HOMER, NEBRASKA.

WAGON-BRAKE.

No. 864,073.　　　　　Specification of Letters Patent.　　　Patented Aug. 20, 1907.

Application filed September 17, 1906. Serial No. 334,843.

*To all whom it may concern:*

Be it known that I, JOHN B. BUBB, a citizen of the United States, residing at Homer, in the county of Dakota and State of Nebraska, have invented new and useful Improvements in Wagon-Brakes, of which the following is a specification.

This invention relates to wagon brakes and one of the principal objects of the same is to provide reliable and efficient means for braking the rear wheels of a vehicle whenever the horses attempt to back up.

Another object of the invention is to provide a vehicle brake which is set into operation when the animals back up or in going down a hill, the forward movement of the wheels being permitted with a slight friction against the brake shoe.

Figure 2:
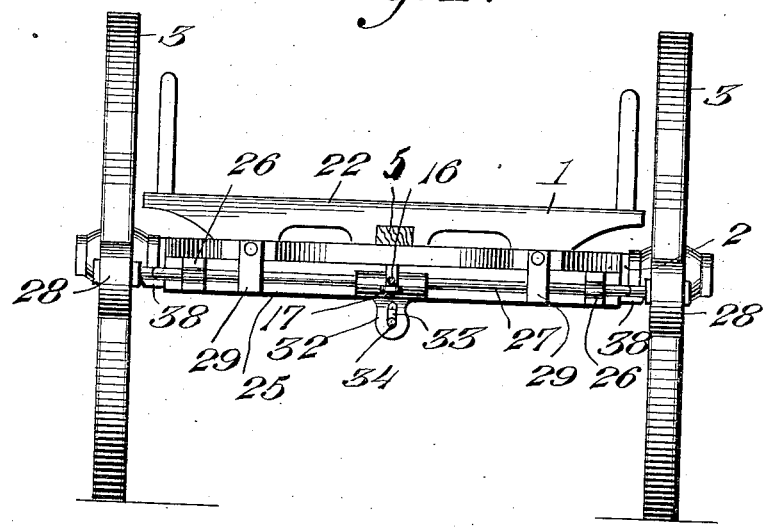
Figure 3:
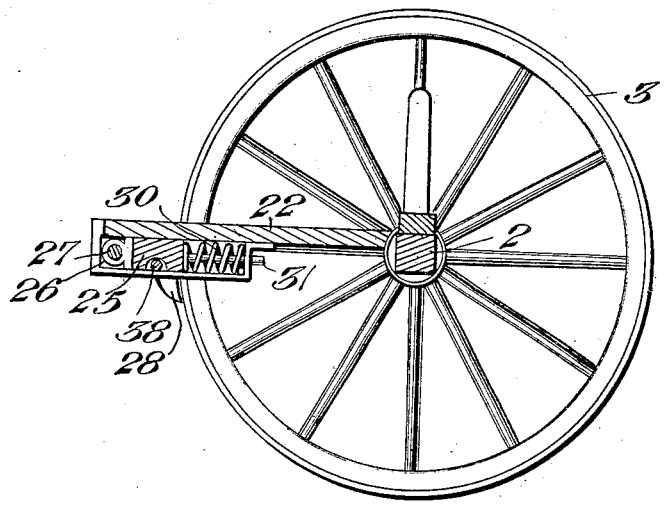

The foregoing objects and others are attained by means of the construction illustrated in the accompanying drawings, in which:

Figure 1 is an underside plan view of the running gear of a vehicle, and showing my automatic brake connected thereto. Fig. 2 is a view in elevation of the rear wheels of the vehicle and showing the reach in section. Fig. 3 is a detail longitudinal section through the rear axle and showing one of the springs for throwing the brake shoe away from the rear wheels.

Referring to the drawings for a more particular description of my invention, the numeral 1 designates the front axle and 2, the rear axle of a wagon or other wheeled vehicle. The front wheels 3 are journaled to the axle 1 and the rear wheels 4 are mounted to rotate on the axle 2. A reach 5 is pivotally connected to the front axle and the hounds 6 are suitably connected to the front axle 1 with a tongue 7 secured between them in any suitable manner. On the front end of the tongue a pin 8 is secured, said pin adapted to receive the neck yoke ring of the team. Extending laterally from the front end of the tongue is a bracket 9 and pivotally connected at 10 to said bracket are oppositely disposed links 11, the front ends of which are provided with apertures 12 to which the breast chain or strap is connected. Pivotally connected to the rear end of the link 11 are oppositely disposed connecting rods 13 and the rear ends of said rods are engaged with a ring 14 on the front end of a bar 15, the end of which is pivoted to a rod 16 which extends back and is connected to a metal strap 17 mounted to slide upon the reach 5 and provided with a link 18 at its rear end. Connected to the link 18 are connecting bars 19 pivoted to levers 20, said levers 20 being pivoted at 21 to a platform 22 secured to the rear axle 2. Links 23 are pivoted at the outer ends of the levers 20 and the opposite ends of the links 23 are pivoted to a bracket 24 secured to the rear side of a cross bar 25. Mounted to rotate in keepers 26 secured to the cross bar 25 is a double crank shaft 27 to the outwardly projecting ends of which are pivoted the brake shoes 28. The cross bar 25 is mounted to slide in guide straps 29 secured at their ends to the platform 22. Springs 30, Fig. 3, surround rearwardly projecting rods 31 connected to the cross bar 25, said springs serving to push the cross bar 25 forward to disengage the brake shoes 28 from the rear wheels 4. Connected to the crank shaft 27 is a bracket 32 provided with a slot 33 through which projects a pin 34 hinged at 35 to the cross bar 25. A spring 36 surrounds the pin 34 and bears at its ends against the bracket 32 and against a lug 37 on the cross bar 25. Stop pins 38 secured at the opposite ends underneath the cross bar 25, serve to prevent the crank shaft 27 from downward movement beyond an operative position.

The operation of my invention may be described as follows: In going down a hill, or, when the animals back up, the links 11 are moved upon the pivots 10 to draw forward upon the rods 13, 15 and 16, and pull forward upon the inner ends of the levers 20, thus pulling backward the cross bar 25 and applying the brake shoes 28 against the rear wheels 4, a slight movement of the wheels 4 being permitted by means of the spring 36 and the bracket 32.

From the foregoing it will be obvious that an automatic brake made in accordance with my invention, will be applied to the rear wheels of a vehicle in going down a hill or whenever the animal attempts to back up. The entire brake is located underneath the reach and under a platform projecting forward from the rear axle and is fully protected from accidental breakage.

Having thus described the invention, what I claim is:

1. An automatic vehicle brake comprising a cross bar mounted to slide in guides, a double crank shaft journaled in keepers on said cross bar and carrying brake shoes at its outer ends, springs for moving the cross bar forward to disengage the brake shoes on the wheels and means connected to the cross bar and leading forward to the harness for applying the brake shoes when the animals move backward or when going down a hill, substantially as described.

2. In a vehicle brake, the combination of a crank shaft, brake shoes on said shaft, stops to limit the location of said crank shaft, means for moving said crank shaft to apply the brakes and a spring to permit the crank shaft to move away from the stops when the wheels are rotated in the forward direction, substantially as described.

3. A vehicle brake comprising a sliding cross bar, guides for said cross bar, springs in the guides for moving said cross bar toward the front, a double crank shaft journaled in said cross bar, stops on said cross bar to limit the rotation of said crank shaft and connections between said cross bar and the animals for moving said cross bar and crank shaft to apply the brake shoes, substantially as described.

In testimony whereof, I affix my signature in presence of two witnesses.

JOHN B. BUBB.

Witnesses:
　GRACE WILBUR,
　R. E. EVANS.